United States Patent [19]

Goronszy

[11] Patent Number: 4,891,128
[45] Date of Patent: Jan. 2, 1990

[54] SOLIDS EXCLUDING SURFACE SKIMMER

[75] Inventor: Mervyn C. Goronszy, Cremorne, Australia

[73] Assignee: Transfield, Inc., Irvine, Calif.

[21] Appl. No.: 276,790

[22] Filed: Nov. 28, 1988

Related U.S. Application Data

[63] Continuation-in-part of Ser. No. 252,561, Sep. 30, 1988, abandoned.

[51] Int. Cl.⁴ .............................................. B01D 21/24
[52] U.S. Cl. .................. 210/121; 210/242.1; 210/525
[58] Field of Search ..................... 210/121, 241, 242.1, 210/525, 608, 776, 242.3

[56] References Cited

U.S. PATENT DOCUMENTS

| | | | |
|---|---|---|---|
| 1,709,783 | 4/1929 | Etheredge | 210/242.1 |
| 2,364,022 | 11/1944 | Gillard | 210/776 |
| 3,774,767 | 11/1973 | Field | 210/242.1 |
| 4,290,887 | 9/1981 | Brown et al. | 210/242.1 |
| 4,462,909 | 7/1984 | Kennel | 210/525 |
| 4,693,821 | 9/1987 | Goronszy et al. | 210/241 |

Primary Examiner—Richard V. Fisher
Assistant Examiner—Christopher Upton
Attorney, Agent, or Firm—Grant L. Hubbard

[57] ABSTRACT

A skimmer for decanting treated liquid from sewage treatment basins comprising a weir, barrier, sealing means and mounting means so constructed and disposed as to define a solids-free decantation zone of increasing size during lowering of the weir during decantation is described.

4 Claims, 1 Drawing Sheet

SOLIDS EXCLUDING SURFACE SKIMMER

CROSS-REFERENCE TO RELATED APPLICATION

This is a continuation-in-part of copending patent application Ser. No. 252561, Filed Sept. 30, 1988, now abandoned.

BACKGROUND OF THE INVENTION

This invention relates generally to moveable surface skimming weir devices, and more particularly, to moveable weirs for removing supernatant treated liquids from sewage and waste treatment systems.

Many of the more common sewage treatment processes involve various pretreatment steps, mixing, aeration, etc. and, ultimately, the capture of the sewage undergoing treatment in a settling basin where the biomass settles to the bottom of the basin. In the course of treating sewage a layer of solids accumulates on the top of a body of the sewage undergoing treatment. These floating solids can be composed of a biological growth which forms a cohesive layer of scum of varying thickness, which may be from several inches to a few feet in thickness. Other solids, large degradables and non-degradables such as plastic containers, etc. can also be contained with this mass together with naturally floating components such as oil and grease. The treated sewage is a clear substantially non-polluting liquid body overlaying the settled biomass upon which the scum and solids float. This body of clear, treated supernatant liquid is periodically removed from the system and the treatment cycle is repeated with input of raw sewage into the system. Such systems are referred to as variable volume activated sludge or sequencing batch reactor systems because the activated sludge constitutes the biological medium through which digestion takes place and the volume of liquid in the basis cyclically varies from a high water level to a low water level, these levels being fixed by the mechanism and mode of supernatant removal.

It is very important that the combination of scum, undigested and undigestible solids and settled solids which float on the top and the settled solids which reside in the lower portion of the liquid body be retained within the basin. when the clear supernatant liquid is withdrawn from the variable volume activated sludge basin when the clear supernatant liquid, which constitutes the treated effluent from the treatment basin, is removed. A satisfactory skimmer must be designed and constructed to permit the supernatant liquid to be removed without accepting the surface scum and debris and also without disturbing the settled solids during decantation. Efficient decantation requires that surface liquid be removed, either during the entire decantation period as is the case with commonly used skimer mechanisms or at least during the final phase of decantation when the upper surface approaches the upper interface with the settled biomass in the bottom of the basin. It is equally important that the decanter be designed and constructed to remove liquid at a relatively high rate without creating velocity vectors in the liquid flow adjacent the decanter which will cause the settled solids to mix with the clear supernatant liquid.

A variety of weirs have been designed to accomplish the removal of the treated supernatant free of contamination from the floating scum and debris and settled solids. Exemplary of such weir designs are those described by Brown and Jones in U. S. Pat. No. 4,290,887 and by the present inventor in U.S. Pat. No. 4,290,821. As the aforementioned patents describe, it is common practice to provide a weir which is permitted or caused to move downwardly during withdrawal of the treated supernatant between a top level which corresponds with the upper water level to the lower water level during decantation and to float or move to the upper water level during filling of the basin.

SUMMARY OF THE INVENTION

The present invention is an improved weir generally of the type described characterized in the unique mode of operation and mechanism which provides, during decantation, an increasing solids-free decantation zone adjacent the lip of the weir to permit more rapid decantation while excluding the settled and surface solids and scum from the zone of decantation.

The invention comprises a skimmer for decanting treated liquid from a sewage settling basin formed of an elongate weir having an input lip over which liquid from the basin may flow into the weir. A conduit in liquid communication with the weir removes liquid from the weir, and hence from the basin. Means for raising and lowering the weir relative to the liquid level in the basin to decant liquid from the basin and thus control the liquid levele. The weir is characterized in comprising extended end plates on the ends of the weir between which an elongate scum and solids barrier is disposed generally parallel to the weir. A moveable solids barrier seal between the respective ends of the solids barrier and the respective end plates prevents entry of solids into the decantation zone. Linkage means mount the solids barrier for movement away from the weir during lowering of the weir. The weir, end plates, seals and barrier are so constructed and disposed as to define a solids-free decantation zone of increasing size during lowering of the weir during decantation. The seals may comprise resilient flaps mounted on the ends of the barrier resting against the plates for relative movement therewith. The linkage may comprise a link secured to and extending from the barrier, a link secured to and extending from the weir, and means pivotally connecting the two links.

DESCRIPTION OF THE PREFERRED EMBODIMENT

The drawings depict an exemplary, non-limiting embodiment of the invention which is described as being the best mode currently known to the inventor and not as limiting the scope of the invention.

Figure 1:
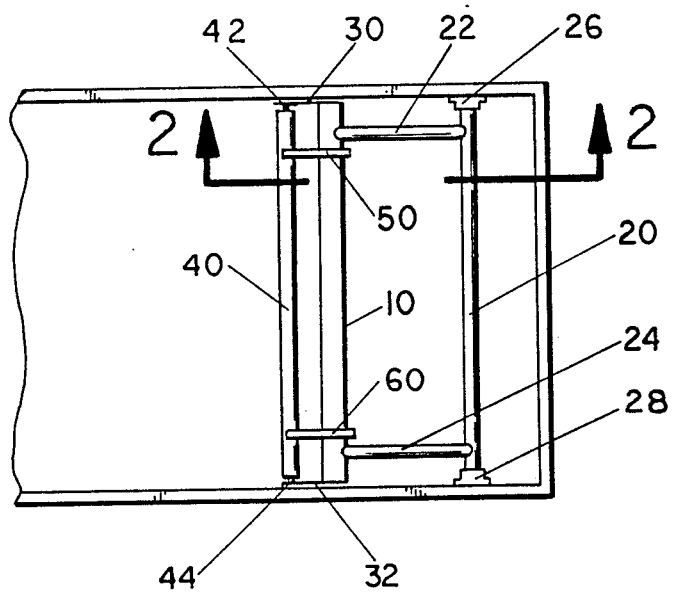
FIG. 1 is a top schematic view of the skimmer of this invention in a sewage settling basin showing the relationship of the major components of the invention.

Referring first to FIG. 1, the skimmer comprises, as major components, an elongate weir 10, an effluent removal conduit 20 and downcomer conduits 22 and 24.

In this particular embodiment, the conduit 20 is journaled for pivotal movement in pivots 26 and 28 which may be connected to the walls of the settlement basin, as shown, or to any other desired structure. The ends of the weir comprise extended plates 30 and 32 which close the ends of the weir and extend forwardly therefrom and, as will be described, define the ends of a solids-free decantation zone during the decanting phase of the treatment process. An elongate floating scum and solids barrier 40, approximately same length as the weir, includes a surface scum intersector 41 which may be of metal or formed, as shown, of an elongate rubber or polymer strip secured in one, or as shown, two places to the barrier, the strip being split for double connection or formed of two layers of polymer or rubber fold upon each other and extending from the barrier as shown. The elongate surface scum intersector secured along the length of the barrier and extending downwardly therefrom and is constructed is disposed for intersecting the surface scum cleanly upon entry of the skimmer into the liquid in the basin. The barrier 40 is mounted parallel thereto by linkages 50 and 60 carries resilient seals 42 and 44 at the ends thereof which ride against and form a seal with the end plates 30 and 32.

Figure 2:
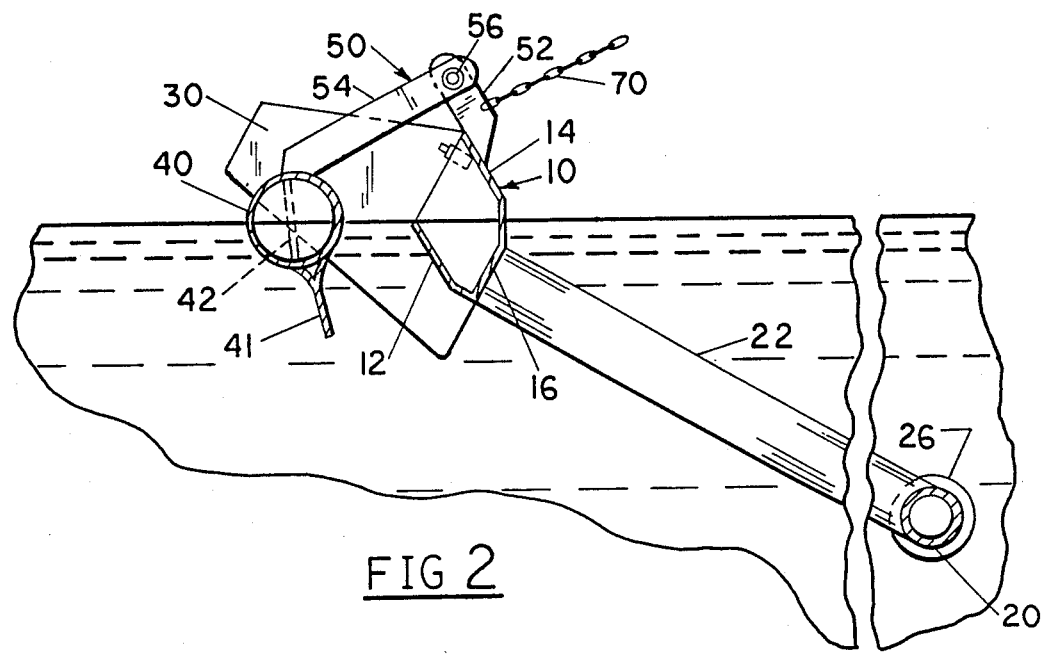
FIG. 2 is a side cross-sectional view of the skimmer, partially broken away, taken generally along lines 2—2 of FIG. 1 in the direction of the arrows.
Figure 3:
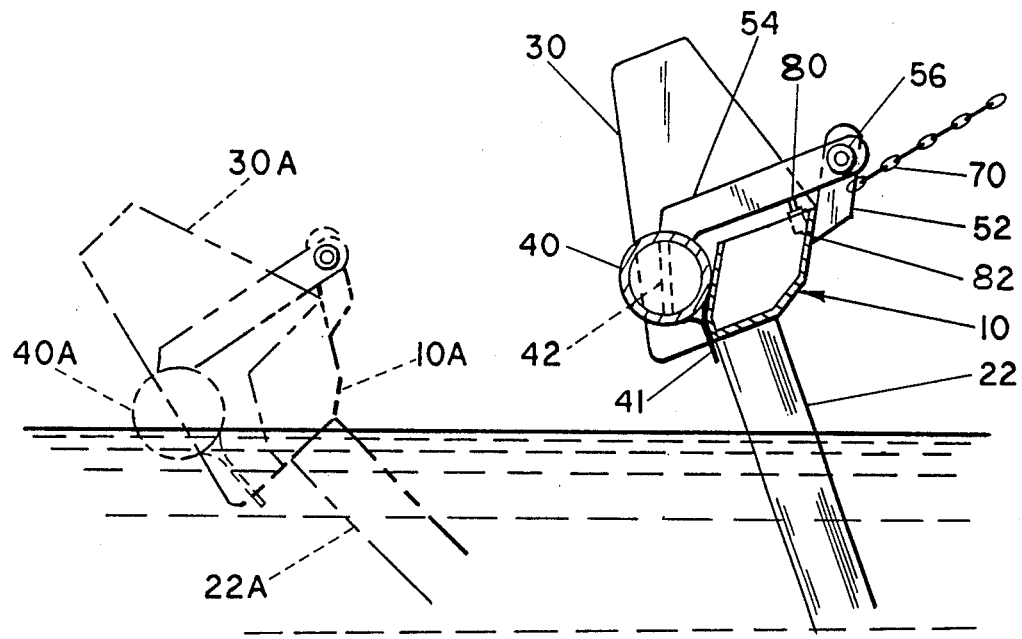
FIG. 3 is another side view in partial cross-section showing the skimmer raised above the upper liquid level and, in phantom lines, the skimmer as it is lowered into the liquid, depicting the action of the skimmer in clearing the solids from the surface of the liquid.

Further detial of the exemplary structure is shown in FIGS. 2 and 3 to which reference is now made. The weir, in the embodiment which is depicted, is an elongate trough formed of a bottom 12, the distal lip of which defines the liquid input to the weir. The lip edge portion of the bottom 12 is configured and constructed such that liquid flowing into the weir flows in a substantially laminar pattern from the uppermost surface of the supernatant liquid, thus creating only a gentle horizontal flow vector with no significant vertical flow vector and, hence, no mixing of the settled solids, even when decanting immediately adjacent the interface with the settled solids. The rate of flow, and hence the magnitude of the flow vector, is controlled by lowering the weir at a rate to maintain the lip a very short distance, e.g. 0.1 to about 1 inch, under the liquid surface. Higher decantation rates can be tolerated in the upper portions of the body of clear supernatant liquid than very near the interface of the settled solids, and movement of the weir may, if desired be adjusted to take advantage of this phenomenon. In addition, it will be noted that as the weir is lowered, the bottom becomes more horizontal, thus creating a more laminar flow into the weir, with less vertical flow vector. The weir is also comprised of a top 14 and a back wall 16 to which the downcomers 22 and 24 are connected forming a liquid communication path from the interior of the trough through the downcomers to the effluent removal conduit 20. As the weir is lowered, the effluent liquid flows into the weir and is removed from the basin through conduit 20.

The scum barrier 40 is mounted parallel to the weir for movement away from the weir during decanting by a linkage 50 which comprises a link 52 welded or otherwise secured to and extending from the weir, a link 54 secured to and extending from the barrier and a pivot pin 56. The linkage 60 is of like construction. The scum barrier is, in the exemplary form, a hollow tube which is buoyant and floats on the surface extending into the water below the bottom of the scum and debris layer and above the water higher than the top of the scum layer. Other floating barriers or barriers which are connected to maintain the stated relation with respect to the scum layer may be used, however. The pivotal linkage which has been described is a very simple and effective linkage in this combination of structures; however, other linkages or mechanisms which maintain the described relationship between the weir and the barrier may be considered as well.

FIG. 2 depicts the skimmer in operation decanting liquid from the basin. It will be noted that there is an area between the lip of the bottom 12 of the weir and the barrier 40, and between the end plates 30 and 32 which is free of floating solids. The linkages 50 and 60 function to cause the barrier to move away from the weir as the weir is lowered, thus clearing an increasing solids free decantation zone adjacent the lip of the weir. This action is shown in FIG. 3 in which the skimmer is depicted raised above the upper water level with the barrier resting against or very near the weir. The phantom line portion of FIG. 3 depicts the position of the barrier relative to the weir as the skimmer is brought into contact with the liquid surface. It will be noted that the barrier has moved a short distance from the lip of the weir, clearing a portion of the surface of the liquid of scum and solids and forming a solids-free decanting zone even before the lip reaches the water level. Thus, the scum and solids are prevented from entering the weir and an increasingly large solids-free decantation zone is formed and maintained as the decantation progresses. Once the desired volume of liquid has been decanted, to the lower liquid level, the skimmer is lifted and the refill portion of the cycle commences. The skimmer may be lifted by any convenient means. For example, the conduit 20 could be rotated by any convenient lever or gear mechanism or, as depicted, the weir lifted directly by a chain 70 or any other desired means. The skimmer may, for example, be positioned a distance above the normal upper liquid level but in the basin such that decantation will automatically proceed if the liquid level is raised above the normal upper liquid level, as may occur, for example, during a severe rain storm.

Referring again to FIG. 3, in particular, a screw or other moveable member 80 is threadably or otherwise adjustably received in a bracket 82 on the weir, permitting adjustment of the pivot and the barrier relative to the weir.

While a pivotal movement means generally as described by way of example is convenient, it is not necessary to the function of the invention and other movement means may be employed. Likewise, resilient rubber flap seals 42 and 44 are a convenient means for sealing the decantation zone against entry of solids, but inflatable or other seals may be used. Indeed, many variations from the specific structure which is depicted and described as an example may be employed without departing from the scope of the invention.

INDUSTRIAL APPLICATION

This invention is applicable to domestic and industrial water and sewage treatment systems.

What is claimed is:

1. A skimmer for decanting treated liquid from a sewage settling basin, comprising:
    an elongate weir which comprises an input weir lip means over which liquid from the basin may flow;
    conduit means in liquid communication with the weir for removing liquid from the basin;
    means for raising and lowering the weir relative to the liquid level in the basin;
    extended end plates on the ends of the weir;

an elongate floatable scum and solids barrier means disposed generally parallel to the weir, said barrier means comprising an elongate floatable structure and an elongate surface scum intersector secured along the length of the barrier means and extending downwardly therefrom, said barrier means being constructed and arranged to seal against the weir when the skimmer is raised above the liquid in the basin and to intersect surface scum cleanly upon entry of the skimmer into such liquid in the basin to prevent entry of scum into the weir when, in use, the skimmer enters the liquid;

means forming a moveable solids barrier seal between the respective ends of the solids barrier means and the respective end plates; and linkage means mounting the solids barrier means to said weir, said linkage means being constructed and arranged to allow for movement of said solids barrier means away from the weir during lowering of the weir;

the weir, end plates, seal means and barrier means being so constructed and arranged to permit the barrier means to move away from the weir as the liquid level in said basin lowers to thereby define a solids-free decantation zone of increasing size between said weir and said barrier means during lowering of the skimmer during decantation.

2. The skimmer of claim 1 wherein the seal means comprise resilient flaps mounted on the ends of the barrier means resting against the plates for relative movement therewith.

3. The skimmer of claim 2 wherein the linkage means comprises a link secured to and extending from the barrier means; a link secured to and extending from the weir, and means pivotally connecting the two links.

4. The skimmer of claim 1 wherein the linkage means comprises a link secured to and extending from the barrier means, a link secured to and extending from the weir, and means pivotally connecting the two links.

* * * * *